United States Patent [19]
Fenster et al.

[11] 3,912,221
[45] Oct. 14, 1975

[54] STEM SEAL AND RETAINER FOR GATE VALVE

[75] Inventors: Abraham S. Fenster; Fred W. Salloga, both of Chattanooga, Tenn.

[73] Assignee: United States Pipe and Foundry Company, Birmingham, Ala.

[22] Filed: June 26, 1974

[21] Appl. No.: 483,112

[52] U.S. Cl. ............... 251/214; 277/37; 251/266; 251/327
[51] Int. Cl.². F16K 41/00; F16K 31/50; F16K 3/00
[58] Field of Search ............ 251/266, 267, 268, 269, 251/270, 214, 327; 277/35, 37

[56] References Cited
UNITED STATES PATENTS

| 1,958,988 | 5/1934 | Eisele | 251/270 |
| 3,026,898 | 3/1962 | Weller | 251/270 X |
| 3,734,458 | 5/1973 | Tricini | 251/267 |
| 3,763,880 | 10/1973 | Leopold | 251/268 X |
| 3,788,600 | 1/1974 | Allen | 251/266 X |

*Primary Examiner*—Alan Cohan
*Attorney, Agent, or Firm*—James W. Grace

[57] ABSTRACT

A gate valve of the non-rising stem type comprising a stem collar is located inside the bonnet section thus requiring no seal plate or seal plate bolts. A cartridge type seal unit is held in place by the operating nut and the stem and gates are held in the up position by a snap ring.

4 Claims, 3 Drawing Figures

STEM SEAL AND RETAINER FOR GATE VALVE

Background of the Invention

1. Field of the Invention:

This invention is in the field of non-rising stem gate valves. More specifically, it is in the field of retaining and sealing the stem portion of a non-rising stem gate valve.

2. Description of the prior art:

Non-rising stem gate valves are provided with a stem collar which in the case of conventional gate valves is enclosed between the bonnet top and a seal plate bolted thereto. Pressure inside the valve bonnet, plus the compression of the valve stem, when the gates are forced into the closed position, must be resisted by the bolts holding the seal plate to the bonnet top. There are, of course, other methods that are known by which the seal plate might be attached to the bonnet such as coacting threads. All of these methods offer chances of leakage due to the elongation of the bolts clamping the seal plate to the bonnet or the fit of threads used for a like purpose.

Prior art non-rising stem gate valves generally are of undue height because the stem portion above the top of the bonnet requires an additional seal plate.

Summary of the Invention

There is herein disclosed a novel gate valve in which the bonnet itself serves as a part of a seal system and in which an extra seal plate is eliminated.

It is an object of this invention to decrease the required height of non-rising stem gate valves.

It is also an object of this invention to reduce the number of parts required for non-rising stem gate valves.

It is a further object of this invention to furnish a gate valve wherein the main stem seals can be changed while the bonnet is pressurized.

Brief Description of the Drawings

Other objects and advantages will become evident from a consideration of the following description taken in conjunction with the accompanying drawings in which like numerals indicate like elements and in which.

Description of the Preferred Embodiment

Figure 1:
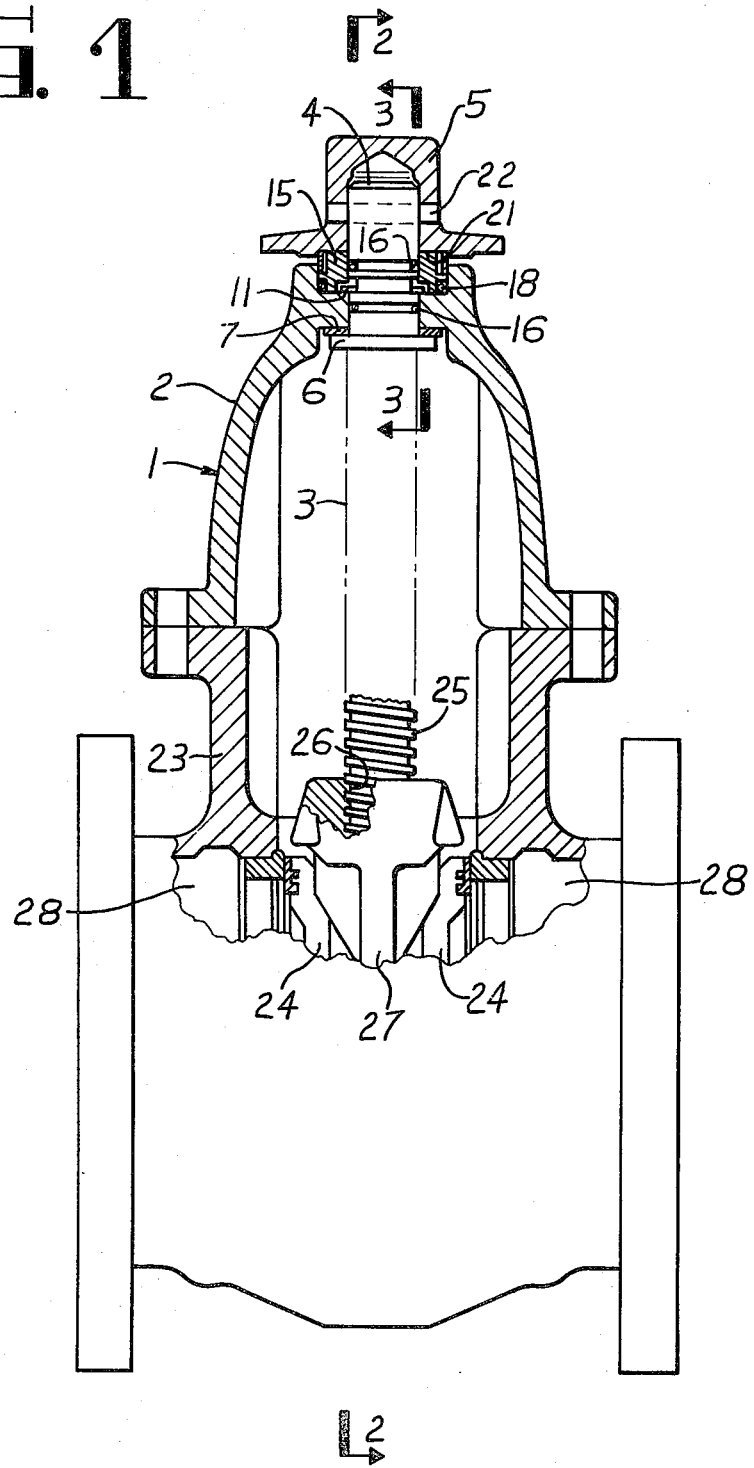
FIG. 1 is a sectional elevational view of a non-rising stem gate valve.
Figure 2:
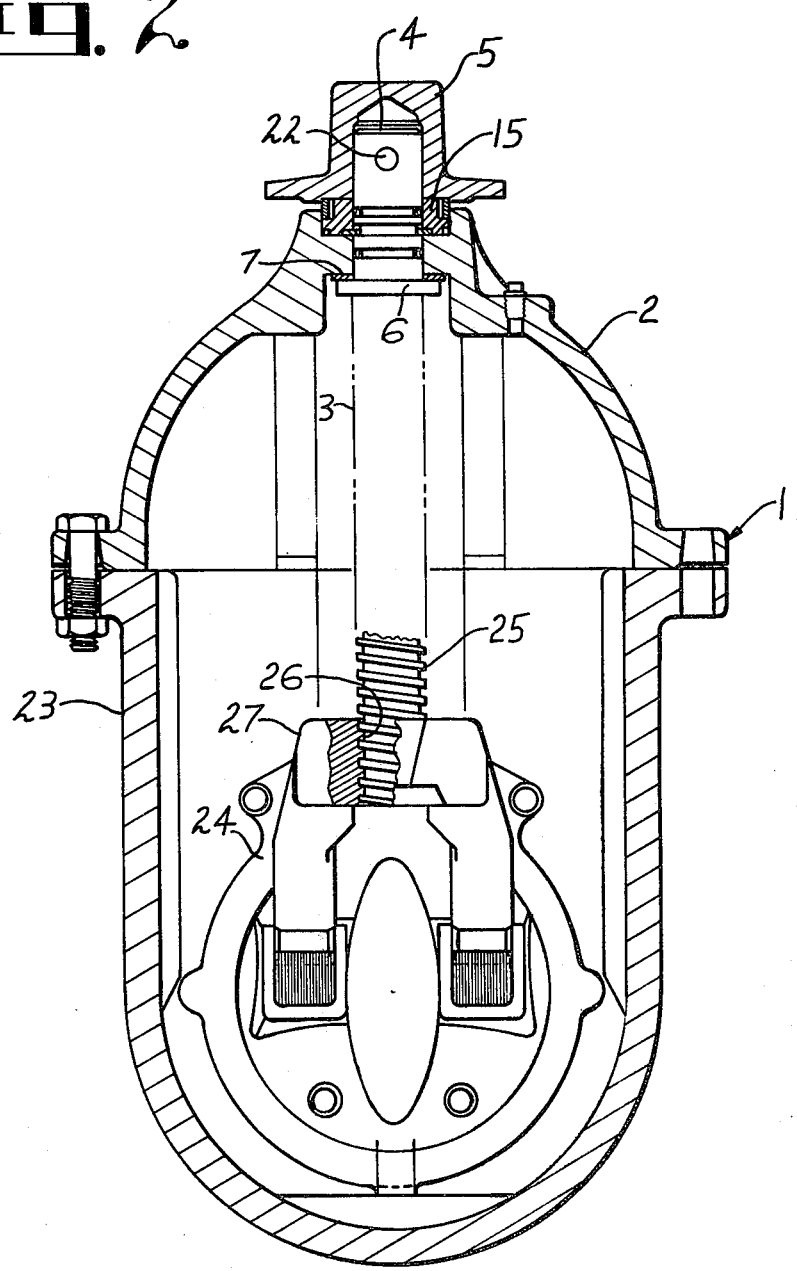
FIG. 2 is a sectional elevational view of the non-rising stem gate valve taken along line 2—2 of FIG. 1.
Figure 3:
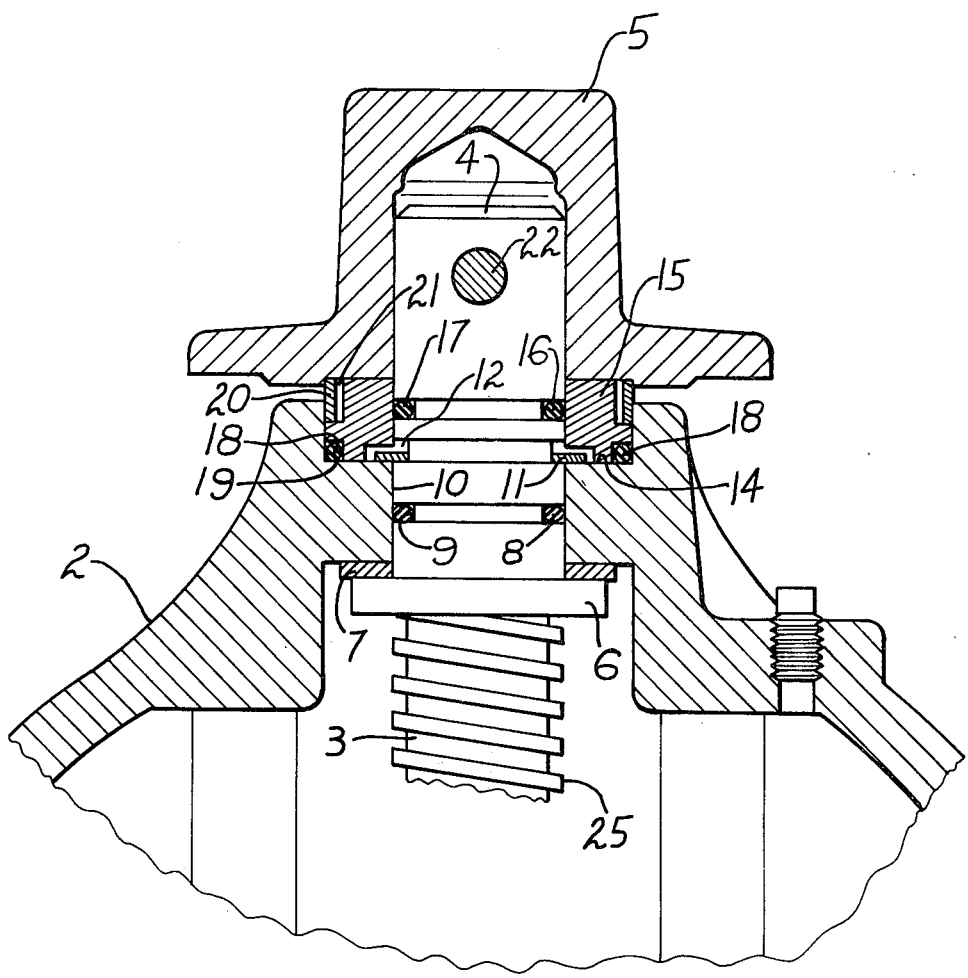
FIG. 3 is a fragmented sectional elevation taken along the lines 3—3 of FIG. 1.

Referring to the drawings, there is shown a gate valve 1 with a bonnet 2 and a stem 3. Stem 3 passes upwardly through an elongated tubular opening in the top of the bonnet 2 which has an end 4 inside a hollow operating means or nut 5. Nut 5 is adapted to be grasped by a wench or other device to rotate stem 3 either clockwise or counterclockwise to open or close gate valve 1. Stem 3 is retained inside the bonnet 2 by a stem collar 6. A thrust washer 7 is located between an inner surface of bonnet 2 and stem collar 6. An inside contaminant seal 8 fills groove 9 in stem 3 and is compressed against stem elongated tubular opening 10 in bonnet 2. Stem 3 is further retained by snap type retainer ring 11 which fits inside groove 12 in stem 3 and rests on shoulder 14 of bonnet 2. Thus, stem 3 is held against upward movement by stem collar 6 and against downward movement by retainer ring 11. Also resting on shoulder 14 is seal cartridge 15. Stem pressure seal 16 is in groove 17 in stem 3 and seals stem 3 against seal cartridge 15 before stem 3 emerges from bonnet 2. Also bonnet pressure seal 18 is in notch 19 and seals against bonnet 2 to prevent leakage around seal cartridge 15. Outside contaminant seal 20 lies in notch 21 and seals between nut 5 and bonnet 2. Nut 5 is held on stem 3 by pin 22 which extends through a hole drilled transversly through stem 3. Stem 3 extends into the body portion 23 of the valve and connects to gates 24 by means of coacting threads 25 on stem 3 and threads 26 in yoke 27. Gates 24 block flow openings 28 when the gates 24 are in the position shown. Yoke 27 is held between gates 24 and the gates are in turn prevented from separating or turning by body portion 23.

The description and operation of the gates 24 by means of cylindrical ring 26 and threaded portion 25 of stem 3 are more fully disclosed in copending application Ser. No. 438,376, filed Jan. 31, 1974 and entitled: "Double Disc Gate Valve." Since the latter disclosure is not essential to the invention herein disclosed and described, that disclosure is incorporated by reference herein.

Operation of the Invention

Gate valves in many piping systems may not be readily taken out of service for repairs and must operate in an environment hostile to such mechanisms. Many are in lines buried several feet below ground level. Some are in underwater lines and almost all valves are subjected to dusty or dirty environments that can contaminate the valve's mechanisms from the outside. The fluid carried in the pipe line also will almost always contain a source of contamination which can contaminate the valve's mechanisms from the inside. The present invention provides means to minimize or substantially eliminate the effects of such contamination on the valve stem seal mechanism and at the same time provide a stronger stem and a more reliable stem seal.

Again referring to the drawings, it may be seen that when nut 5 is turned in a certain direction gates 24 will be forced down by the action of threads 25 and 26 and thus block flow openings 28. It is also apparent that when gates 24 have reached the extremity of their downward movement, further rotation of nut 5 in the same direction will create a compressive stress in stem 3. This compressive stress is in the portion of stem 3 between the engaged threads 25 and the upper portion of stem collar 6. Since there is a quite large mechanical advantage afforded by the threads and any lever used to rotate nut 5, this compressive stress is often sufficiently high as to cause bending in stem 3 and in some cases failure due to such bending. It can also be readily seen that were the stem collar 6 placed outside bonnet 2 and enclosed by a seal plate, as in conventional non-rising stem gate valves, the portion of stem 3 in compression would be longer and thus less capable of resisting such compression. It is also evident that the reaction to the compression of stem 3 is resisted entirely within the bonnet 2 and the body portion 23, while in a conventional valve with a seal plate the reaction must be resisted by the relatively weak seal plate and seal plate bolts. Since contamination can be expected from the fluid flowing through the valve, inside contaminant seal 8 is provided to protect the pressure seals 16 and 18 from such. Both pressure seals 16 and 18 may be replaced with the gates opened or closed. This seal replacement is readily accomplished by removing pin 22, then removing nut 5 and simply lifting out seal cartridge 15 along with seals 16 and 18 from the top of bonnet 2 and over the end of stem 3. The combination of holding the seal cartridge 15 with the operating nut 5 and placing the stem collar 6 inside the bonnet 2 eliminates the need for a conventional seal plate and seal plate attachment means. Stem 3 is prevented from downward movement by snap type retainer ring 11 which is fitted into groove 12 of stem 3 and rests on shoulder 14 of bonnet 2. This snap ring arrangement prevents the stem and gate assembly from dropping into the body portion of the valve should it be necessary to change the seal cartridge while the gates are open. Also, stem 3 is prevented from moving in the upward direction since stem collar 6 is too large to pass through stem opening 10 in bonnet 2. Outside contaminant seal 20 may be replaced by simply removing pin 22 and nut 5. This seal 20 protects the seal cartridge and seals out whatever environment the valve must operate in. While contaminant seal 8 may not be changed while the valve is pressurized, it is easily seen that its purpose is substantially accomplished even though some fluid leaked past it and reached seals 16 and 18. A small quantity of fluid reaching seals 16 and 18 would not carry sufficient contaminant to effect these seals.

In summary, there is herein disclosed a novel gate valve in which the bonnet itself serves as a part of a seal system and in which an extra seal plate is eliminated.

We claim:

1. In combination with a non-rising stem gate valve of the type comprising a body portion with flow openings, a bonnet portion attached to said body portion in fluid-tight relationship thereto, means for opening and closing said flow openings, said means including a stem extending through a tubular opening in said bonnet, the improvement comprising a stem seal shoulder on an inner surface of said bonnet surrounding said tubular opening, a collar surrounding an intermediate portion of said stem and being of greater diameter than said tubular opening to prevent said stem from movement outwardly with respect to said bonnet, an upper shoulder on said bonnet surrounding said tubular opening exteriorly of said bonnet, means, entirely within said tubular opening, connecting said stem and said upper shoulder to prevent said stem from moving inwardly with respect to said bonnet and a slip fitting seal cartridge surrounding said stem and resting on said upper shoulder, said cartridge having an annular notch, a first "O" ring seal inserted in said notch, and being radially compressed between said seal cartridge and said bonnet portion, said stem having an annular groove therein, and a second "O" ring seal inserted in said groove and being radially compressed between said stem and said seal cartridge to prevent fluid leakage along said stem.

2. A non-rising stem gate valve as recited in claim 1 in which said means connecting said stem and said upper shoulder is a detachable retainer ring.

3. A non-rising stem gate valve as recited in claim 1 in which an operating means is secured to the upper end of said stem and said seal cartridge is interposed between said operating means and said bonnet.

4. A non-rising stem gate valve as recited in claim 1 in which a seal is compressed between said operating means and said seal cartridge.

* * * * *